United States Patent
Osawa et al.

(10) Patent No.: US 12,422,401 B2
(45) Date of Patent: Sep. 23, 2025

(54) CAPILLARY ELECTROPHORESIS DEVICE

(71) Applicant: HITACHI HIGH-TECH CORPORATION, Tokyo (JP)

(72) Inventors: Kentaro Osawa, Tokyo (JP); Manabu Shiozawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 382 days.

(21) Appl. No.: 18/011,284

(22) PCT Filed: Jul. 31, 2020

(86) PCT No.: PCT/JP2020/029496
§ 371 (c)(1),
(2) Date: Dec. 19, 2022

(87) PCT Pub. No.: WO2022/024368
PCT Pub. Date: Feb. 3, 2022

(65) Prior Publication Data
US 2023/0228709 A1    Jul. 20, 2023

(51) Int. Cl.
*G01N 27/447* (2006.01)
(52) U.S. Cl.
CPC .............. *G01N 27/44721* (2013.01)
(58) Field of Classification Search
None
See application file for complete search history.

(56) References Cited

U.S. PATENT DOCUMENTS

| | | |
|---|---|---|
| 2005/0106065 A1 | 5/2005 | Fuji |
| 2009/0255814 A1 | 10/2009 | Yamazaki et al. |
| 2019/0271636 A1 | 9/2019 | Deguchi et al. |
| 2021/0262980 A1 | 8/2021 | Takahashi et al. |

FOREIGN PATENT DOCUMENTS

| | | |
|---|---|---|
| JP | H08-086772 A | 4/1996 |
| JP | 2005-147954 A | 6/2005 |
| JP | 2009-257804 A | 11/2009 |
| JP | 2012-529268 A | 11/2012 |
| JP | 2016-180608 A | 10/2016 |
| JP | 2017-507342 A | 3/2017 |
| JP | 2018-017644 A | 2/2018 |
| JP | 2018-084523 A | 5/2018 |
| WO | WO-2010/141921 A1 | 12/2010 |
| WO | WO-2015/134925 A1 | 9/2015 |
| WO | WO-2019/244358 A1 | 12/2019 |

OTHER PUBLICATIONS

International Search Report issued in corresponding International Application No. PCT/JP2020/029496, dated Oct. 6, 2020, with English Translation.

*Primary Examiner* — J. Christopher Ball
(74) *Attorney, Agent, or Firm* — Foley & Lardner LLP (57) ABSTRACT

In order to provide a highly sensitive capillary electrophoresis device, a light source, a mirror configured to cause light emitted from the light source to be reciprocally transmitted through a capillary, and a measurement photodiode detecting an optical signal based on the light reciprocally transmitted through the capillary are provided.

12 Claims, 7 Drawing Sheets

CAPILLARY ELECTROPHORESIS DEVICE

TECHNICAL FIELD

The present invention relates to a technique of a capillary electrophoresis device.

BACKGROUND ART

Biopharmaceuticals have excellent action that an antibody molecule modified with a sugar chain exerts an effect on a specific target such as cancer or rare and intractable diseases, which is not found in small molecule drugs. The small molecule drugs are synthesized by chemical reactions, whereas biopharmaceutical drugs are generated utilizing biological functions of cells, and thus, molecular structures of products are affected by slight changes in culture conditions. Immunoglobulin G (IgG), which is a representative biopharmaceutical drug, is a large molecule having a complicated structure and a molecular weight of about 150,000. It is nearly impossible to prevent structural heterogeneity in such large molecules. Therefore, quality inspection techniques for confirming the safety and efficacy of preparations in biopharmaceutical drugs play an even more important role. Since the immunoglobulin G or the like has a complicated structure of a target substance, test items of biopharmaceutical drugs are diverse. Capillary electrophoresis is used as an inspection item of the biopharmaceutical drugs in a confirmation test for confirming that a main component contained in an object to be inspected is a target substance, a purity test for evaluating the content of impurities, and the like. In a capillary electrophoresis device, a sample such as an antibody is injected into a capillary and electrophoresed, so that the sample is separated according to a molecular weight and the amount of charge, and is detected by a detection unit provided near a capillary terminal. As a detection scheme, optical schemes such as ultraviolet (UV) absorption, native fluorescence (NF), and laser-induced fluorescence (LIF) are widely used.

PTL 1 discloses a sample detection device and a sample detection apparatus in which "disc substrates 1a and 1b that transmit a light beam a are provided, a channel 4 for a flow of a polymer is formed in a sample detection device 1 obtained by bonding the substrates 1a and 1b. According to the sample detection device 1 in which a first reflection film 12 made of a dielectric configured to reflect the light beam a is formed in a region corresponding to a region where the channel 4 is formed on a back side of a surface of the sample detection device 1 on which the light beam a is incident, one optical system can serve as both an optical system for a forward path (for incident light) of the light beam and an optical system for a return path (for reflected light) of the light beam, and it is easy to downsize a body of the sample detection apparatus".

CITATION LIST

Patent Literature

PTL 1: JP 2005-147954 A

SUMMARY OF INVENTION

Technical Problem

In the capillary electrophoresis device, a capillary having an extremely thin inner diameter of 5 to 250 µm is used in order to suppress generation of Joule heat. Thus, a region irradiated with measurement light, which is light for measuring the capillary, is extremely small. Then, there is a problem that the detection sensitivity is low (a minimum detectable sample concentration is large) because the region irradiated with the measurement light is extremely small. Further, electrophoresis of one sample requires a long time (typically about 30 minutes). Thus, a low throughput is also a problem. In PTL 1, four samples can be measured at the same time by performing optical measurement while rotating the disc substrates provided with four electrophoresis channels in a state of being irradiated with light (measurement light), thereby improving the throughput. In such a structure, however, a portion other than the channel is irradiated with the measurement light in most of the time. Thus, the irradiation time of the measurement light per channel is shortened, and the sensitivity is lowered. Further, the channel is produced in the disc substrate rotatable at a high speed, and thus, there is also a problem that a channel length is shortened and separation performance of the electrophoresis is lowered.

The present invention has been made in view of such a background, and an object of the present invention is to provide a highly sensitive capillary electrophoresis device.

Solution to Problem

In order to solve the above problems, the present invention includes: a light source unit; an irradiation optical unit that causes light emitted from the light source unit to be reciprocally transmitted through a capillary; and a first light detection unit that detects an optical signal based on the light reciprocally transmitted through the capillary.

Other solutions will be described as appropriate in embodiments.

Advantageous Effects of Invention

According to the present invention, the highly sensitive capillary electrophoresis device can be provided.

DESCRIPTION OF EMBODIMENTS

Next, modes for carrying out the present invention (referred to as "embodiments") will be described in detail with reference to the drawings as appropriate. Incidentally, similar constituent elements in each of the drawings will be denoted by the same reference signs, and the description thereof will be omitted.

First Embodiment (Overall Configuration Diagram of Capillary Electrophoresis Device E)

Figure 1:
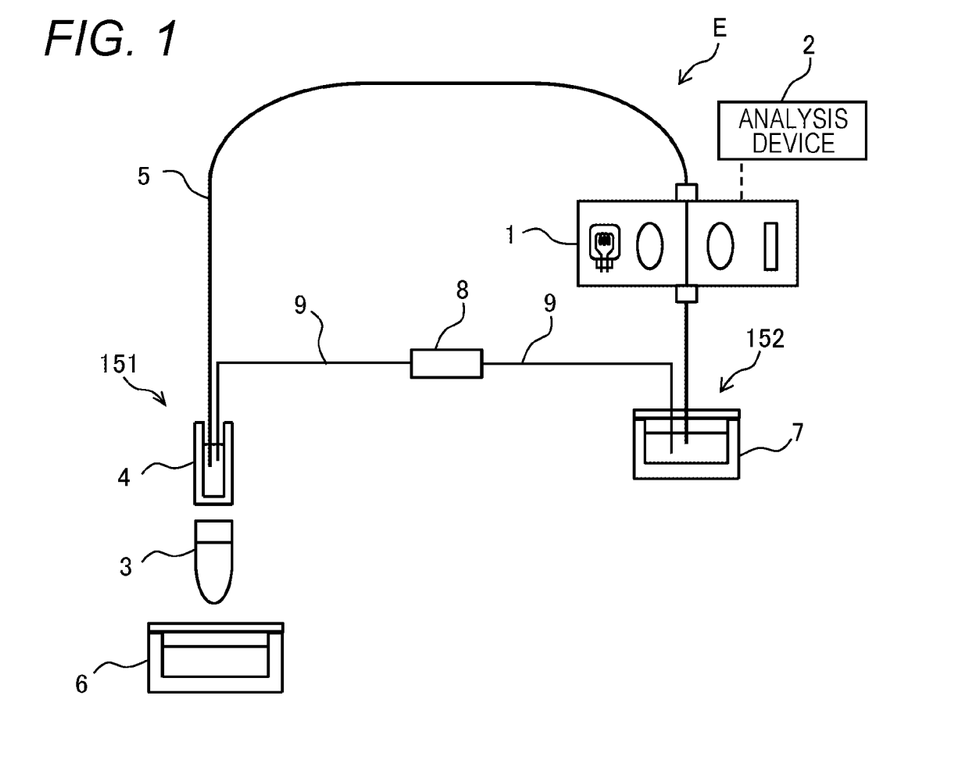
FIG. 1 is a schematic diagram illustrating an overall configuration example of a capillary electrophoresis device according to a first embodiment.

FIG. 1 is a schematic diagram illustrating an overall configuration example of a capillary electrophoresis device E according to a first embodiment.

The capillary electrophoresis device E includes a detection device 1, an analysis device 2, a capillary 5, a high-voltage power supply 8, and an electrode 9.

As illustrated in FIG. 1, an electrophoresis medium container 6 and a sample container 3 contain a sample and an electrophoresis medium, respectively. Prior to the measurement, the capillary 5 is first connected to the electrophoresis medium container 6. Then, the electrophoresis medium is injected into the capillary 5 by electric means, pressure injection, or the like. When the electrophoresis medium is sufficiently injected into the capillary 5, the capillary 5 is connected to the sample container 3. Then, the sample is injected into the capillary 5 by electrical means, pressure injection, or the like.

Each of an injection-side electrode bath 4 and a discharge-side electrode bath 7 is filled with a buffer solution. At the time of measurement, an end of the capillary 5 and an end of the electrode 9 are immersed in the injection-side electrode bath 4 and the discharge-side electrode bath 7, respectively. Then, when a voltage is applied to each of the injection-side electrode bath 4 and the discharge-side electrode bath 7 from the high-voltage power supply 8, the capillary 5 is moved from an injection side 151 toward a discharge side 152 while each of molecules of the sample is separated by electrophoresis according to properties such as a molecular weight and the amount of charge. When reaching the detection device 1, each of the molecules of each moved sample is detected by optical means in the detection device 1. Further, the analysis device 2 is connected to the detection device 1. The analysis device 2 receives a signal from the detection device 1, and performs analysis necessary to analyze the molecules in the sample on the basis of the signal. Incidentally, the capillary electrophoresis device E includes the high-voltage power supply 8 and a control device (not illustrated) that controls pressure for injecting the electrophoresis medium or the sample into the capillary 5. Incidentally, in the capillary 5, the periphery of a tubular quartz is coated with polyimide. However, the polyimide of the capillary 5 is peeled off to expose the quartz tube inside the detection device 1.

(Configuration of Detection Device 1)

Figure 2:
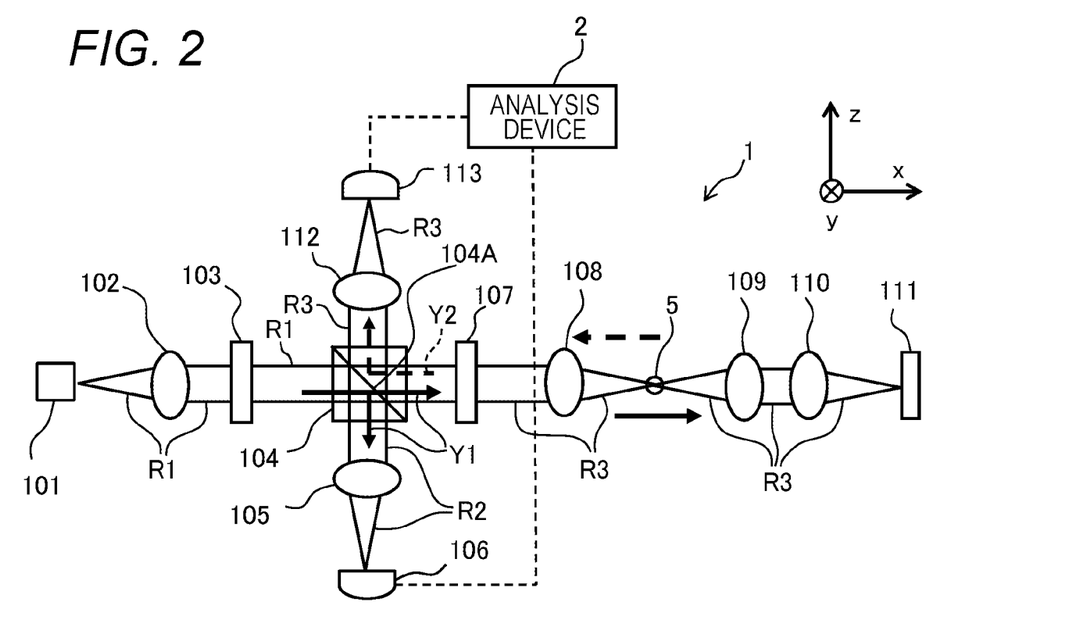
FIG. 2 is a diagram illustrating a configuration example of a detection device according to the first embodiment.

FIG. 2 is a diagram illustrating a configuration example of the detection device 1 according to the first embodiment.

The detection device 1 includes a light source 101, a lens 102, a band-pass filter 103, a polarization beam splitter 104, a λ/4 plate 107, a lens 108, a lens 109, a lens 110, and a mirror 111 in order from the light source 101 side. The capillary 5 is arranged at a light collecting positions of the lens 108 and the lens 109 between the lens 108 and the lens 109. Further, a reference condenser lens 105 and a reference photodiode 106 are provided on one of paths of light reflected from the polarization beam splitter 104. Further, a measurement condenser lens 112 and a measurement photodiode 113 are provided on the other of the paths of the light reflected from the polarization beam splitter 104.

In FIG. 2, a solid arrow indicates a forward path of light, and a broken-line arrow indicates a return path of light.

First, light (light source light R1) emitted from the light source 101 is converted into collimated light by the lens 102. Here, the lens 102 is a collimator lens (first collimator lens). Thereafter, only light having a specific wavelength is extracted by the band-pass filter 103. In a case where UV absorption measurement of proteins is performed, transmission wavelengths of the band-pass filter 103 are 280 nm, 220 nm, and the like. Further, in a case where native fluorescence (NF) measurement is performed, transmission wavelengths of the band-pass filter 103 are 280 nm and the like. Furthermore, in a case where laser-induced fluorescence (LIF) measurement is performed, a transmission wavelength of the band-pass filter 103 is set to an excitation wavelength of a fluorescent dye to be used. In a case where an emission spectrum of the light source 101 has only a target wavelength component, the band-pass filter 103 can be omitted. Hereinafter, the case where the UV absorption measurement is performed will be described.

The light source light R1 transmitted through the band-pass filter 103 is split (solid arrows indicated by reference sign Y1) by the polarization beam splitter 104 into reference light R2 of an S-polarization component (light of a second polarization component) and measurement light R3 of a P-polarization component (light of a first polarization component). Here, a reflection surface 104A of the polarization beam splitter 104 reflects the S-polarization component but transmits the P-polarization component. The reflection surface 104A is installed in an inclined state such that the light of the S-polarization component reflected in a direction toward the reference photodiode 106 (second light detection unit) is directed to a traveling direction of the collimated light converted by the lens 102. Therefore, the light of the S-polarization component is reflected in the direction toward the reference photodiode 106. Here, the light reflected by the polarization beam splitter 104 is referred to as the reference light R2, and the light transmitted through the polarization beam splitter 104 is referred to as the measurement light R3.

The reference light R2, reflected by the polarization beam splitter 104 in the direction toward the reference photodiode 106, is collected by the reference condenser lens 105 and detected by the reference photodiode 106. Here, a splitting ratio between the reference light R2 and the measurement light R3 by the polarization beam splitter 104 is 1:1 in a case where the light source 101 that emits unpolarized light, such as a lamp, is used. Further, in a case where the light source 101 that emits polarized light, such as a laser light source, is used, the splitting ratio varies depending on a polarization state. In such a case, however, the polarization state can be adjusted to freely set the splitting ratio, for example, by installing a λ/2 plate after the band-pass filter 103. Hereinafter, the description will be made assuming that a lamp light source is used as the light source 101.

On the other hand, the measurement light R3, transmitted through the polarization beam splitter 104, is converted into circularly polarized light by the λ/4 plate 107, and then, collected on and emitted to the capillary 5 by the lens 108. Here, the lens 108 is a collimator lens (second collimator lens). The measurement light R3 transmitted through the capillary 5 is converted into collimated light by the lens 109 which is a collimator lens. Then, the measurement light R3 converted into the collimated light by the lens 109 is collected on and emitted to the mirror 111 by the lens 110. Incidentally, the lens 110 is a collimator lens (third collimator lens). The measurement light R3 reflected by the mirror 111 retraces the same optical path as before, is collected on the capillary 5 again, and is emitted. Then, the measurement light R3 transmitted through the capillary 5 is converted into collimated light by the lens 108 which is the collimator lens. The measurement light R3 converted into the collimated light by the lens 108 is converted from circularly polarized light into S-polarization light by the λ/4 plate 107.

As described above, the polarization beam splitter 104 has the property of reflecting S-polarization light. Therefore, the measurement light R3 converted into the S-polarization light is entirely reflected by the polarization beam splitter 104 (a broken-line arrow indicated by reference sign Y2). At this time, the measurement light R3 is reflected in a direction toward the measurement photodiode 113 (first light detection unit) by an inclination direction of the reflection surface 104A of the polarization beam splitter 104. The measurement light R3 reflected in the direction toward the measurement photodiode 113 is collected by the measurement condenser lens 112 and detected by the measurement photodiode 113.

Incidentally, in the present embodiment, it is possible to suppress an influence of a variation in an intensity of the light source light R1 emitted from the light source 101 and improve the detection sensitivity by monitoring an intensity of the reference light R2 with the reference photodiode 106.

Alternatively, signals detected by the reference photodiode 106 and the measurement photodiode 113 are input to the analysis device 2. The analysis device 2 can also divide the signal detected by the measurement photodiode 113 by the signal detected by the reference photodiode 106 and display the result thereof.

Incidentally, the reference condenser lens 105 and the reference photodiode 106 can be omitted.

(Analysis Device 2)

Figure 3:
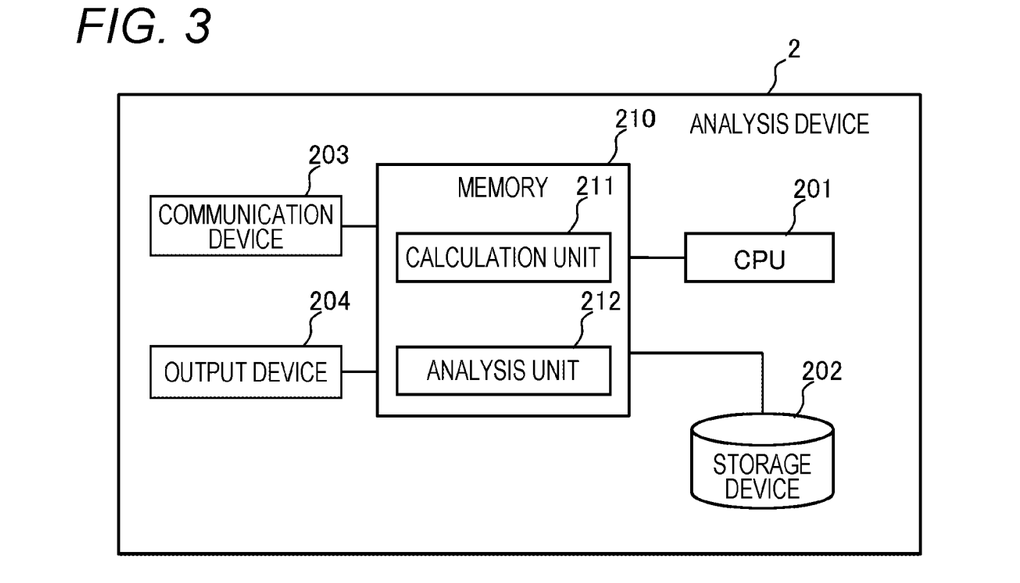
FIG. 3 is a diagram illustrating a configuration example of an analysis device used in the first embodiment.

FIG. 3 is a diagram illustrating a configuration example of the analysis device 2 used in the first embodiment.

The analysis device 2 includes a central processing unit (CPU) 201, a storage device 202 such as a hard disc (HD), a communication device 203, an output device 204 such as a display, and a memory 210.

Here, the communication device receives a signal from the detection device 1 or sends a control signal to the detection device 1 as necessary.

Further, a program is loaded from the storage device 202 into the memory 210, and the loaded program is executed by the CPU 201. As a result, the calculation unit 211 and the analysis unit 212 are embodied.

The calculation unit 211 performs calculation processing such as dividing a signal detected by the measurement photodiode 113 by a signal detected by the reference photodiode 106.

The analysis unit 212 analyzes a component of a sample on the basis of a result of the calculation unit 211, a state of the signal detected by the reference photodiode 106, a state of the signal detected by the measurement photodiode 113, and the like. Then, the analysis unit 212 causes the output device 204 to output an analysis result.

(Effect of Sensitivity Improvement)

In the first embodiment, the capillary 5 is irradiated with light (the measurement light R3) emitted from the light source 101 twice. With such a configuration, an optical path length of the measurement light R3 with which a sample in the capillary 5 is irradiated is doubled, and the detection sensitivity can be improved. That is, since the sample in the capillary 5 is irradiated with the measurement light R3 twice, light reduced by the sample is doubled. As a result, a signal to noise ratio (SNR) can be improved. In other words, the sensitivity can be improved.

In the first embodiment, the capillary 5 is reciprocally irradiated with the measurement light R3 twice since the lenses 108, 109, and 110 and the mirror 111 are arranged in this order from the light source 101 side. Furthermore, the entire amount of the measurement light R3 with which the capillary 5 is reciprocally irradiated can be detected since the polarization beam splitter 104 and the λ/4 plate 107 are utilized in combination.

Hereinafter, this effect will be described in detail using a formula.

In the UV absorption measurement, an absorbance A defined by the following Formula (1) is an evaluation index.

[Expression 1]

$$A = -\log_{10}\left(\frac{I}{I_0}\right) \tag{1}$$

Here, $I_0$ is a detection signal detected by the measurement photodiode 113 at a reference time. The reference time is a time at which the sample does not yet exist in a region of the capillary 5 that is being irradiated with the measurement light R3. For example, a time at which electrophoresis is started is set as the reference time. Further, I is a detection signal at an arbitrary time. Incidentally, the detection signal is proportional to the light amount incident on the measurement photodiode 113. When the sample is injected into the capillary 5 by the electrophoresis, the sample passes through the region of the capillary 5 irradiated with the measurement light R3. Then, the measurement light R3 is absorbed by molecules of the sample, and the detection signal I decreases, so that a peak of the absorbance appears in an electropherogram. From the Lambert-Beer law, a magnitude S of the absorbance by the molecules of the sample is expressed by the following Formula (2).

$$S = \varepsilon c L \tag{2}$$

Here, ε represents a molar absorption coefficient of the molecules of the sample, c represents a molar concentration of a medium, and L represents an optical path length, mainly determined by an inner diameter of the capillary 5, of the medium (mixture of an electrophoresis medium and the sample) through which the measurement light R3 passes.

On the other hand, an absorbance signal noise N is given by the following Formula (3) using a detection signal noise ΔI.

[Expression 2]

$$N = \left(-\log_{10}\left(\frac{I+\Delta I}{I_0}\right)\right) - \left(-\log_{10}\left(\frac{I}{I_0}\right)\right) = -\log_{10}\left(1+\frac{\Delta I}{I_0}\right) \quad (3)$$

Formula (3) is approximately expressed by the following Formula (4) when expanded with the first order of $\Delta I/I_0$.

[Expression 3]

$$N = \frac{1}{\ln 10}\frac{\Delta I}{I_0} \quad (4)$$

The detection signal noise $\Delta I$ includes three components of light intensity noise proportional to the light amount, shot noise proportional to a square root of the light amount, and detector noise. The detector noise is noise derived from the measurement photodiode 113. Then, the detection signal noise $\Delta I$ can be expressed by the following Formula (5) using the light amount P incident on the measurement photodiode 113.

[Expression 4]

$$\Delta I = \sqrt{(aP)^2 + (b\sqrt{P})^2 + c^2} \quad (5)$$

Here, a, b, and c are constants that characterize magnitudes of the light intensity noise, the shot noise, and the detector noise, respectively. Since $I_0$ is proportional to P, the absorbance signal noise N can be expressed by the following Formula (6) from Formulas (4) and (5).

[Expression 5]

$$N = \sqrt{a^2 + \left(\frac{b}{\sqrt{P}}\right)^2 + \left(\frac{c}{P}\right)^2} \quad (6)$$

Incidentally, a proportionality constant applied to the entire formula is omitted for simplification in Formula (6). From the Formulas (2) and (6), an SNR of a signal (optical signal) of the measurement light R3 received by the measurement photodiode 113 is given by the following Formula (7).

[Expression 6]

$$SNR = \frac{\varepsilon cL}{\sqrt{a^2 + \left(\frac{b}{\sqrt{P}}\right)^2 \left(\frac{c}{P}\right)^2}} \quad (7)$$

The SNR represented by Formula (7) is an SNR of a conventional electrophoresis device that irradiates the capillary 5 with the measurement light R3 only once. In the present embodiment, the light amount is reduced to half by the polarization beam splitter 104 (P in Formula (7) becomes P/2), and the optical path length is doubled due to the reciprocal irradiation (L in Formula (7) becomes 2 L). In consideration of these, SNR1 of the measurement light R3 received by the measurement photodiode 113 in the capillary electrophoresis device E of the present embodiment can be expressed by the following Formula (8).

[Expression 7]

$$SNR1 = \frac{\varepsilon c(2L)}{\sqrt{a^2 + \left(\frac{b}{\sqrt{P/2}}\right)^2 + \left(\frac{c}{P/2}\right)^2}} = \frac{\varepsilon cL}{\sqrt{a/2 + \left(\frac{b/\sqrt{2}}{\sqrt{P}}\right)^2 + \left(\frac{c}{P}\right)^2}} \quad (8)$$

When comparing Formula (7) and Formula (8), it can be seen that the light intensity noise component a is effectively reduced by ½ times and the light shot noise component b is effectively reduced by $1/\sqrt{2}$ times in the capillary electrophoresis device E of the present embodiment. Therefore, SNR1>SNR holds. That is, the capillary electrophoresis device E according to the first embodiment can achieve a higher detection sensitivity than before.

Incidentally, the case where the UV absorption measurement is performed has been described in the first embodiment, but the present invention is also applicable to the NF measurement and the LIF measurement. In the case of application to the NF measurement or the LIF measurement, for example, a long-pass filter or the like that blocks an excitation wavelength component and transmits a fluorescence wavelength can be inserted in front of the measurement condenser lens 112.

Further, the reference light R2 split by the polarization beam splitter 104 in the forward path is detected by the reference photodiode 106 in the first embodiment. Then, the calculation unit 211 of the analysis device 2 can divide the intensity of the measurement light R3 detected by the measurement photodiode 113 by the intensity of the reference light R2 detected by the reference photodiode 106. As a result, fluctuations derived from the light source 101 can be offset. As a result, the SNR can be further improved.

Further, the light source light R1 is divided into the reference light R2 of the S-polarization component and the measurement light R3 of the P-polarization component by the polarization beam splitter 104 in the first embodiment. Then, the λ/4 plate 107 is installed at the subsequent stage of the polarization beam splitter 104 as viewed from the light source 101. With such a configuration, the measurement light R3 reflected by the mirror 111 finally becomes the S-polarization light, and is entirely reflected by the polarization beam splitter 104. As a result, it is possible to prevent the measurement light R3 reflected by the mirror 111 from being incident on the light source 101 and to prevent the light source light R1 emitted from the light source 101 from being affected.

Incidentally, the sample moves due to the electrophoresis, and is irradiated with the measurement light R3 twice at different timings. However, a speed of light is sufficiently faster than a speed at which the sample moves, and thus, it can be considered that the sample is substantially stopped relative to the measurement light R3. Therefore, light transmitted only once and light transmitted twice may be considered to be exactly the same as accompanying information of the sample except that a light absorption amount (that is, a light reduction amount of the measurement light R3) by the sample is doubled.

Further, the description is made on the premise of the UV absorption measurement of proteins in the present embodiment, and thus, it is assumed that the SNR is improved as the light absorption (light reduction) in the capillary 5 is increased by the reciprocal irradiation of the measurement light R3. On the other hand, in the case of the native fluorescence measurement or the laser-induced fluorescence measurement, an intensity of fluorescence in the capillary 5 is increased by reciprocal irradiation of the measurement light R3, and thus, an SNR can be improved similarly to the UV absorption measurement.

Second Embodiment

Figure 4:
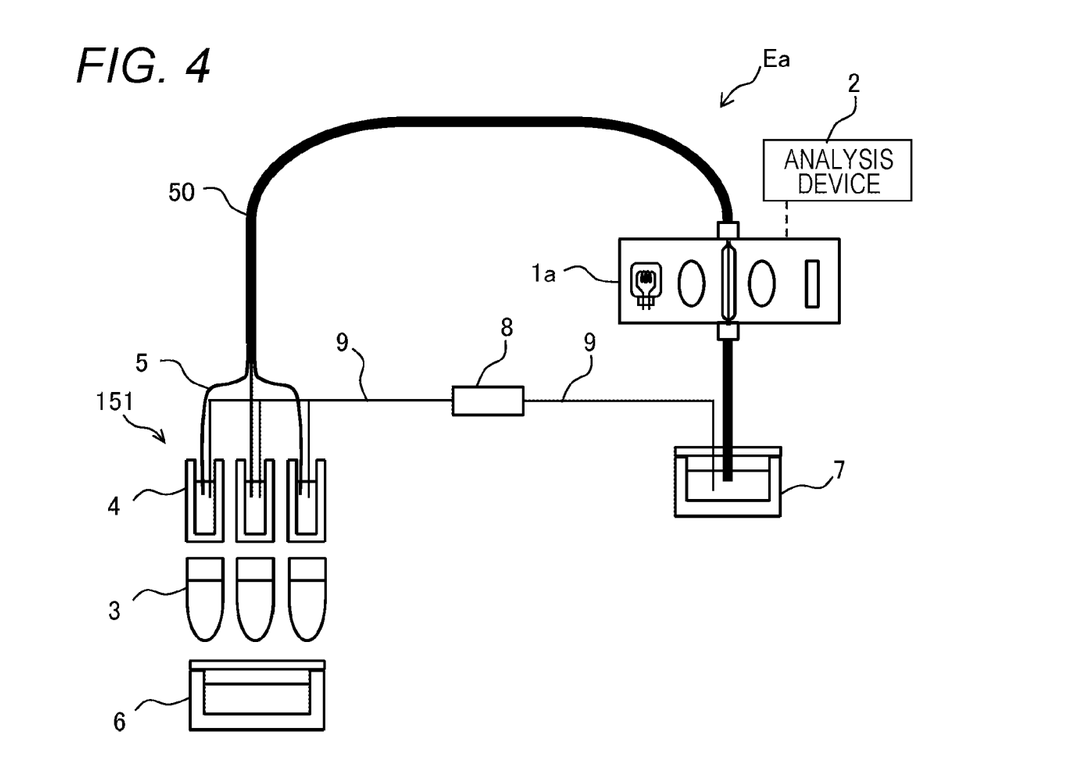
FIG. 4 is a schematic diagram illustrating an overall configuration example of a capillary electrophoresis device according to a second embodiment.

FIG. 4 is a schematic diagram illustrating an overall configuration example of a capillary electrophoresis device Ea according to a second embodiment. Incidentally, the same configurations as those illustrated in FIG. 1 will be denoted by the same reference signs in FIG. 4, and the description thereof will be omitted.

The capillary electrophoresis device Ea illustrated in the second embodiment is different from the capillary electrophoresis device E illustrated in FIG. 1 in terms of including a capillary array 50 including a plurality of the capillaries 5, a plurality of injection-side electrode baths 4, and a plurality of the sample containers 3. In the capillary array 50, the capillaries 5 are connected to the sample containers 3 and the injection-side electrode baths 4, respectively, at ends on the injection side 151. Further, the respective capillaries 5 are aligned and arrayed at a constant pitch in a detection device 1a. Incidentally, a configuration of the analysis device 2 is similar to that of the first embodiment except that the calculation unit 211 and the analysis unit 212 perform processing on each of the capillaries 5, and thus, the description thereof will be omitted.

(Configuration of Detection Device 1a)

Figure 5:
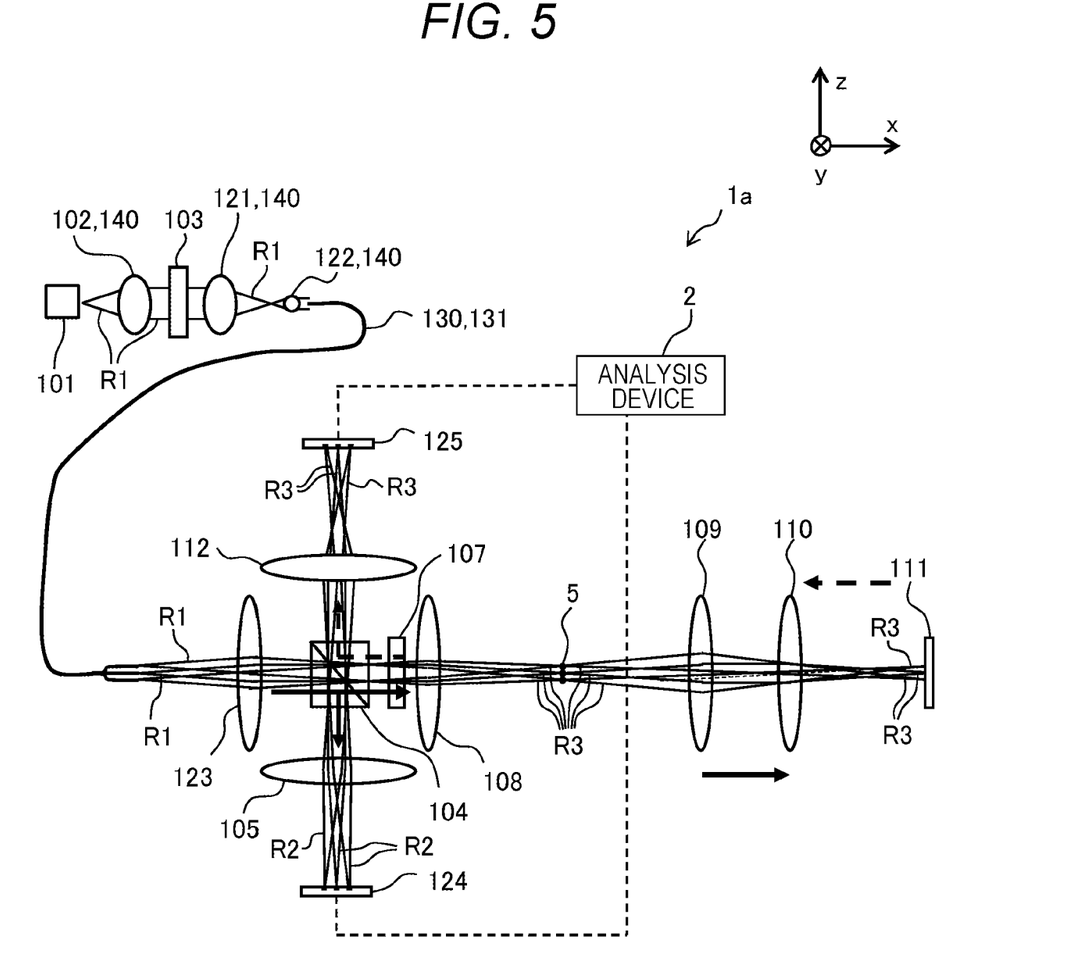
FIG. 5 is a diagram illustrating a configuration example of a detection device according to the second embodiment.

FIG. 5 is a diagram illustrating a configuration example of the detection device 1a according to the second embodiment.

In FIG. 5, configurations similar to those illustrated in FIG. 2 will be denoted by the same reference signs, and the description thereof will be omitted. Incidentally, in FIG. 5, a solid arrow indicates a forward path of light, and a broken-line arrow indicates a return path of light similarly to FIG. 2.

The light source light R1 emitted from the light source 101 is converted into collimated light by the lens 102 that is a collimator lens. The light source light R1 converted into the collimated light by the lens 102 passes through the band-pass filter 103 and is coupled to a fiber bundle 130 including a plurality of optical fibers 131 by a lens 121 and a lens 122. Note that the lens 122 is a collimator lens. The lens 121 may be any lens capable of collecting light. Here, coupling of light to the optical fiber 131 means that light is incident on the optical fiber 131 and propagates inside the optical fiber 131. A configuration of the fiber bundle 130 will be described later. The use of such a fiber bundle 130 enables easy division of the light source light R1.

The lenses 102, 121, and 122 constitute a Koehler illumination system 140, which is an optical system that uniformly illuminates a surface, and play roles of making a spatial light emission intensity distribution of the light source 101 uniform and performing the coupling to the fiber bundle 130. Specifically, the lens 121 and the lens 122 are arranged such that an exit-side focal position of the lens 121 overlaps an incident-side focal position of the lens 122. With such a configuration, fluctuations in the light amount coupling between the optical fibers 131 in the fiber bundle 130 are suppressed, and the same light amount can be coupled to all the optical fibers 131. Further, since the coupling is performed with the uniform intensity distribution, it is possible to suppress a variation in the amount of coupled light caused by vibration due to disturbance or the like of an end face position of the fiber bundle 130 and to prevent a decrease in detection sensitivity.

In this manner, the lenses 102, 121, and 122 are configured to form the Koehler illumination system 140, so that the uniform light source light R1 can be coupled to each of the optical fibers 131 in the fiber bundle 130. Details of the meaning of constituting the Koehler illumination system 140 will be described later.

Incidentally, the lens 121, the lens 122, and the Koehler illumination system 140 correspond to an optical divider and an optical coupler. Further, the fiber bundle 130 and the optical fiber 131 correspond to the optical divider.

Light emitted from each of the optical fibers 131 in the fiber bundle 130 follows an optical path similar to that in the first embodiment. Hereinafter, the description thereof will be briefly made.

Each of beams of the light source light R1 emitted from the optical fibers 131 in the fiber bundle 130 is converted into collimated light by a lens 123 which is a collimator lens. Each beam of the light source light R1 is split into the reference light R2 and the measurement light R3 by the polarization beam splitter 104 similarly to the case of the first embodiment. Each beam of the reference light R2 is collected by the reference condenser lens 105 and detected by a reference photodiode array 124.

On the other hand, each beam of the measurement light R3 is converted into circularly polarized light by the λ/4 plate 107, and then, is collected on and emitted to each of the capillaries 5 in the capillary array 50 by the lens 108. Each beam of the measurement light R3 transmitted through each of the capillaries 5 is converted into collimated light by the lens 109, and then, is collected on and emitted to the mirror 111 by the lens 110. After being reflected by the mirror 111, each beam of the measurement light R3 follows the same optical path, and is collected on and emitted to each of the capillaries 5 again. Each beam of the measurement light R3 transmitted through the capillary 5 is converted into collimated light by the lens 108, and then, the polarization state thereof is converted from the circularly polarized light to S-polarization light by the λ/4 plate 107. The measurement light R3 converted into the S-polarization light is reflected by the polarization beam splitter 104. Each beam of the measurement light R3 reflected by the polarization beam splitter 104 is collected by the measurement condenser lens 112 and detected by a measurement photodiode array 125. Note that the lenses 108 to 110 are collimator lenses similarly to those in FIG. 2.

(Configuration of Fiber Bundle 130)

Figure 6A:
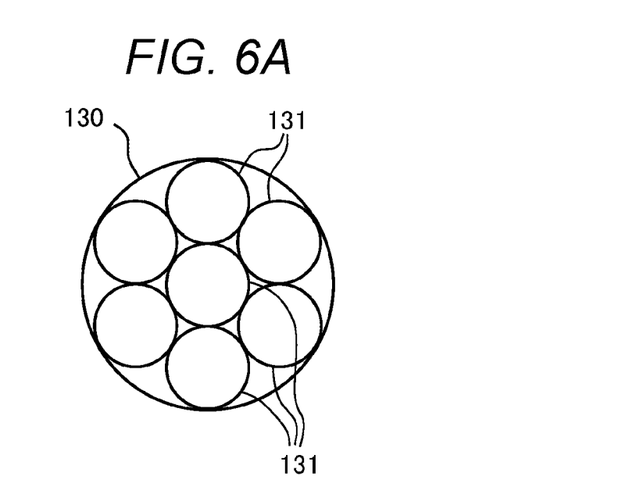
FIG. 6A is an example illustrating a cut surface at an arbitrary location of a fiber bundle (in the case of seven fibers).
Figure 6B:
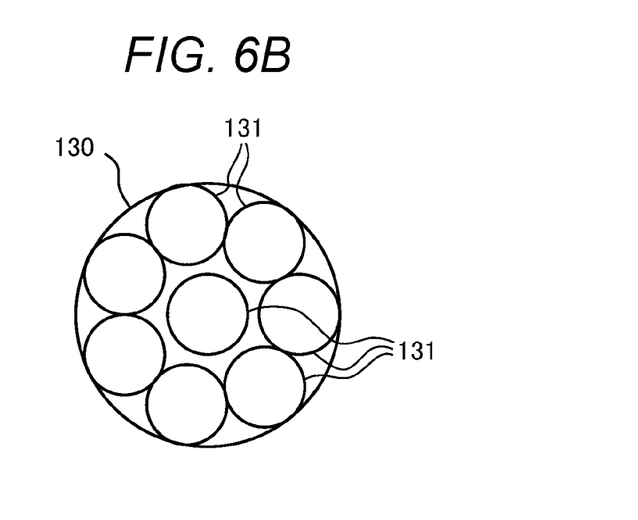
FIG. 6B is an example illustrating a cut surface at an arbitrary location of the fiber bundle (in the case of eight fibers).

FIGS. 6A and 6B are examples illustrating cut surfaces at arbitrary locations of the fiber bundle 130. FIG. 6A illustrates an arrangement of the optical fibers 131 in a case where the number of the optical fibers 131 is seven, and FIG. 6B illustrates an arrangement of the optical fibers 131 in a case where the number of the optical fibers 131 is eight.

It is desirable that the optical fibers 131 have the closest packing arrangement as illustrated in FIG. 6A in order to minimize the energy loss of light as much as possible. That is, it is desirable that the distance between the plurality of optical fibers 131 be minimized in the fiber bundle 130. In the case of the number of optical fibers 131 for which the closest packing arrangement is not possible, it is desirable to arrange the optical fibers such that the distance from the center of the fiber bundle 130 to the center of the outermost peripheral optical fiber 131 is minimized as illustrated in FIG. 6B. As illustrated in FIGS. 6A and 6B, the optical fibers 131 on an exit-side end face of the fiber bundle 130 are arranged to be aligned in lines. As a result, the light source light R1 emitted from the light source 101 is divided to have a substantially uniform intensity by the number of the optical fibers 131 included in the fiber bundle 130.

(Koehler Illumination System 140)

Here, an effect (verification of uniformity of the amount of coupled light) of the lenses 102, 121, and 122 in FIG. 5 constituting the Koehler illumination system 140 will be described on the basis of simulation results.

What is important in the case of dividing light by the fiber bundle 130 and performing the UV absorption measurement is the uniformity and stability of the light amount coupled to each of the optical fibers 131 constituting the fiber bundle 130.

Figure 7A:
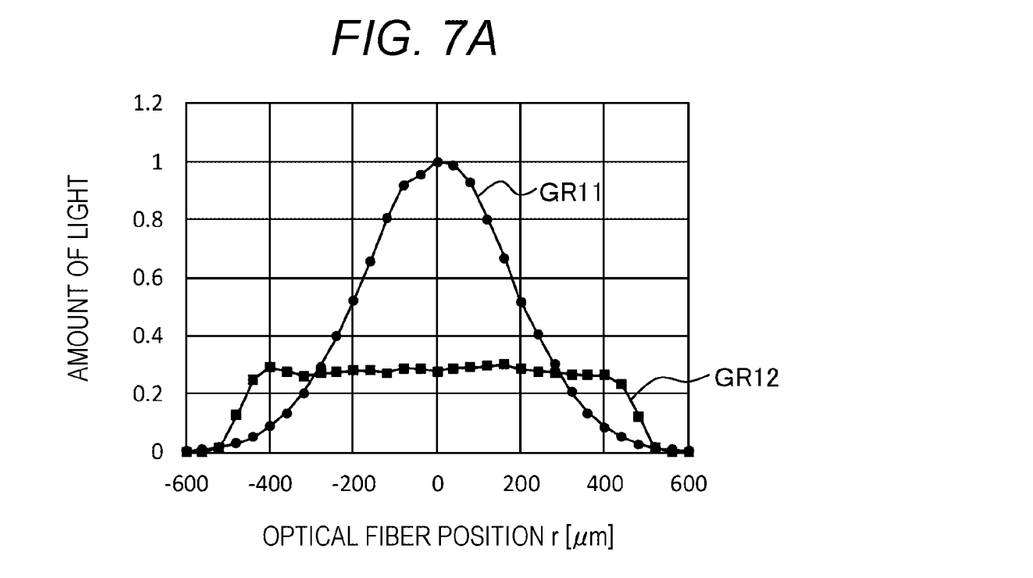
FIG. 7A is a graph of a simulation result illustrating a relationship between a position of an optical fiber in the fiber bundle and the light amount.

FIG. 7A is a graph of a simulation result illustrating a relationship between a position of the optical fiber 131 in the fiber bundle 130 and the light amount.

A graph GR11 in FIG. 7A illustrates a case where an imaging optical system including the lens 122 and the lens 102 is used without providing the lens 121 in FIG. 5. Further, a graph GR12 illustrates a case where the lenses 102, 121, and 122 constitute the Koehler illumination system 140 as illustrated in FIG. 5.

In FIG. 7A, the horizontal axis represents a position r (μm) of the optical fiber 131 in the fiber bundle 130. Incidentally, the center of the fiber bundle 130 is set to "0" in the horizontal axis of FIG. 7A.

In this simulation, a spatial light emission intensity distribution of the light source 101 is assumed as a Gaussian with a full width at half maximum of about 0.35 mm. Further, a transmission wavelength of the band-pass filter 103 is 220 nm. Furthermore, a focal length and an outer diameter of each of the lens 102 and the lens 121 are 50 mm and 20 mmφ, respectively. Further, a focal length and an outer diameter of the lens 121 are 2.71 mm and 3 mmφ, respectively. Then, a core diameter and a numerical aperture (NA) of each of the optical fibers 131 are 105 μm and 0.25, respectively. Under these conditions, the simulation is performed on the basis of ray tracing.

In the case where the imaging optical system is used, the spatial light emission intensity distribution of the light source 101 is reflected as illustrated in the graph GR11, and the amount of coupled light shows a Gaussian dependence on the position r of the optical fiber 131. Thus, the amount of coupled light is larger in the optical fiber 131 at the center (as r is closer to zero) and is smaller in the optical fiber 131 in the periphery (as r is further from zero). This is because the amount of irradiated light is different for each of the capillaries 511.

On the other hand, in the case where the Koehler illumination system 140 is used, the light amount coupled to the optical fiber 131 takes a substantially constant value when the position r of the optical fiber 131 is in a range of ±about 400 μm. Therefore, it is possible to couple substantially the same light amount to all the optical fibers 131 by arranging the optical fibers 131 in this region (r is in the range of ±about 400 μm). This means that all the capillaries 5 are irradiated with substantially the same light amount (light source light R1). Therefore, it is possible to simultaneously measure different samples under the same light amount condition by using the Koehler illumination system 140. Further, a range of the position r of the optical fiber 131 where the amount of coupled light is constant can be freely set by changing a ratio between the focal lengths of the lens 121 and the lens 122.

Further, regarding the stability of the amount of coupled light, it is necessary to consider the influence of displacement of an optical component (the optical fiber 131) due to disturbance. For example, when a position of an incident-side end face of the optical fiber 131 varies, the light amount coupled to the optical fiber 131 also varies accordingly. Assuming that the light amount coupled to the optical fiber 131 at a position (x, y, z) of the optical fiber 131 is I and the amount of positional displacement of the optical fiber 131 is (Δx, Δy, Δz), a variation amount of the amount of coupled light (hereinafter, referred to as a light amount variation) ΔI accompanying the displacement of the optical fiber 131 is approximately given by the following Formula (11).

[Expression 8]

$$\Delta I = \frac{\partial I}{\partial x}\Delta x + \frac{\partial I}{\partial y}\Delta y + \frac{\partial I}{\partial x}\Delta z = \nabla I \cdot \begin{pmatrix} \Delta x \\ \Delta y \\ \Delta z \end{pmatrix} \quad (11)$$

Here, ∇ represents a spatial derivative.

From Formula (11), it can be seen that the light amount variation ΔI increases as a spatial derivative ∇I of the amount of coupled light of the optical fiber 131 increases.

Figure 7B:
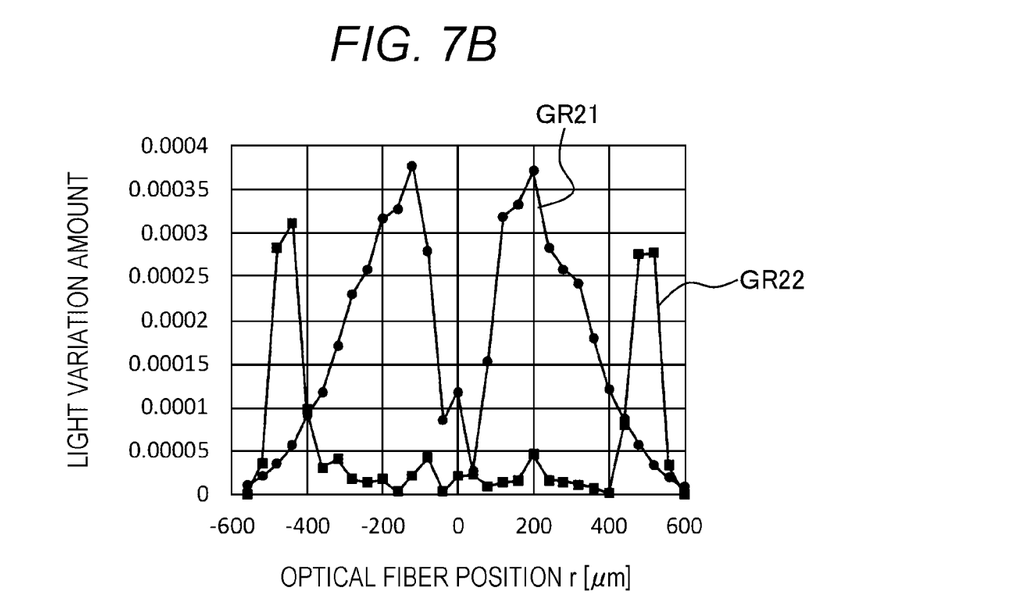
FIG. 7B is a graph illustrating an absolute value of a light amount variation generated when a position of an incident-side end face of the optical fiber varies by Δr in an r direction.

FIG. 7B is a graph illustrating an absolute value of the light amount variation ΔI generated when a position of the incident-side end face of the optical fiber 131 varies by Δr in an r direction. Incidentally, FIG. 7B is calculated on the basis of results of FIG. 7A.

A graph GR21 in FIG. 7B illustrates the case of using the imaging optical system. As described above, the imaging optical system is a system including the lens 122 and the lens 102 without providing the lens 121 in FIG. 5. Further, a graph GR22 illustrates the case where the lenses 102, 121, and 122 constitute the Koehler illumination system 140 as illustrated in FIG. 5. That is, the graph GR21 in FIG. 7B is the result based on the graph GR11 in FIG. 7A, and a graph GR22 in FIG. 7B is the result based on the graph GR12 in FIG. 7A.

Further, in FIG. 7B, the horizontal axis represents the position r (μm) of the optical fiber 131 in the fiber bundle 130. Incidentally, the center of the fiber bundle 130 is set to "0" in the horizontal axis of FIG. 7B.

Then, a magnitude Δr of a positional variation is 0.1 μm.

Further, in FIG. 7B, the horizontal axis represents the position r (μm) of the optical fiber 131 in the fiber bundle 130. Incidentally, the center of the fiber bundle 130 is set to "0" in the horizontal axis of FIG. 7B.

Then, a magnitude Δr of a positional variation is 0.1 μm.

In the case where the imaging optical system is used, it can be seen that the absolute value of the light amount variation ΔI is large in a region other than r=0 μm. This means that a differential of the amount of coupled light with respect to the position r of the optical fiber 131 is large in the region other than r=0 μm. As a result, the detection sensitivity corresponding to the optical fiber 131 arranged in the region other than r=0 μm decreases. That is, in the imaging optical system, the robustness against the positional variation of the fiber bundle 130 is low in the optical fiber 131 arranged outside the vicinity of the center of the fiber bundle 130.

On the other hand, in the case of using the Koehler illumination system 140, it can be seen that the light amount variation is suppressed in a range of r=−360 to 360 μm due to the effect of the uniform intensity distribution (see the graph GR22 in FIG. 7A) as illustrated in the graph GR12. Therefore, the light amount variation with respect to the optical fibers 131 is suppressed by arranging the optical fibers 131 within this region (r=−360 to 360 μm). As a result, it is possible to prevent the decrease in the detection sensitivity. That is, the robustness against the positional variation of the fiber bundle 130 can be set to be high even in the optical fiber 131 arranged outside the vicinity of the center of the fiber bundle 130 in the Koehler illumination system 140.

In the second embodiment, the light source light R1 emitted from the light source 101 is divided into the number of the capillaries 5 and reciprocally irradiates each of the capillaries 5. As a result, similarly to the first embodiment, a high detection sensitivity can be achieved, and simultaneous measurement of a plurality of samples can be performed. As a result, the capillary electrophoresis device Ea according to the second embodiment can achieve a higher throughput than that of a conventional capillary electrophoresis device.

Incidentally, the light source light R1 is divided using the fiber bundle 130 in the second embodiment. However, the present invention is not limited thereto, and the same effect can be obtained by dividing the light source light R1 using other means such as a beam splitter or a diffraction grating.

Third Embodiment

Figure 8:
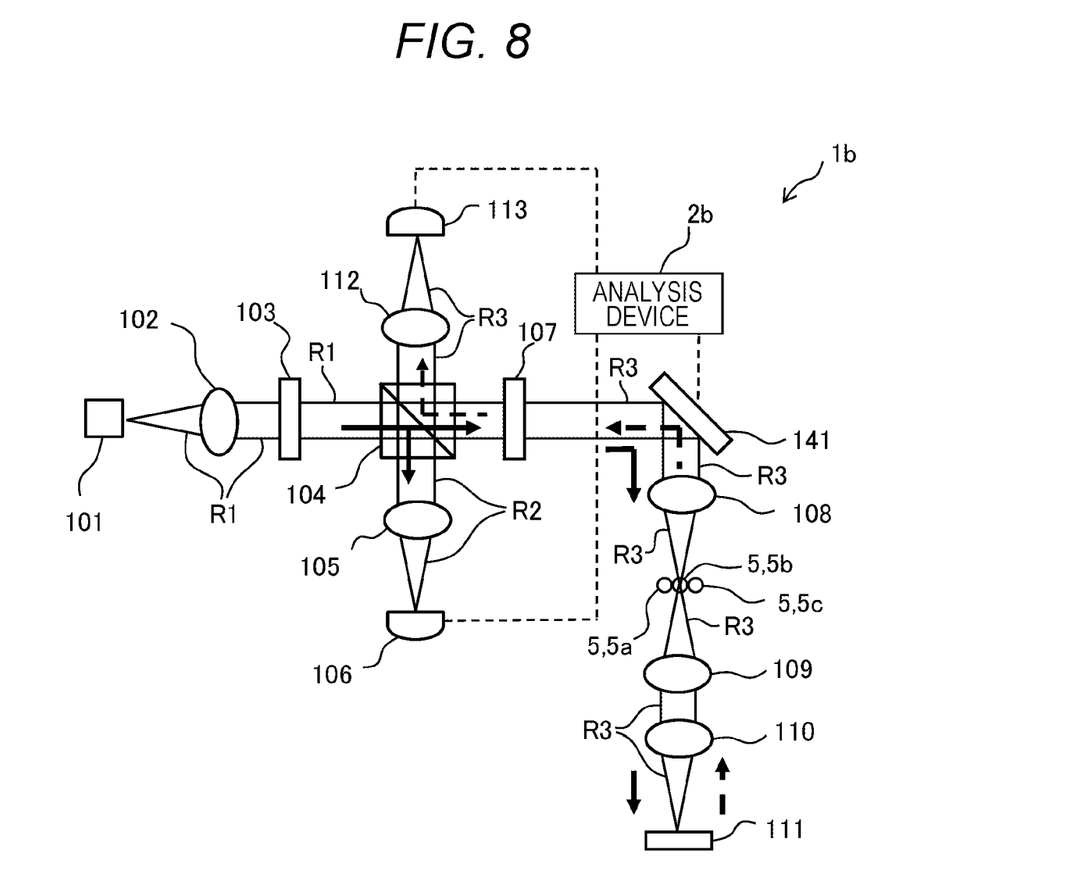
FIG. 8 is a diagram illustrating a configuration example of a detection device according to a third embodiment.

FIG. 8 is a diagram illustrating a configuration example of a detection device 1b according to a third embodiment. In FIG. 8, configurations similar to those in FIG. 2 will be denoted by the same reference signs, and the description thereof will be omitted. Further, the capillary electrophoresis device Ea according the third embodiment is similar to the capillary electrophoresis device Ea illustrated in FIG. 4 except that the detection device 1a is replaced with the detection device 1b, and thus, the illustration and description of the capillary electrophoresis device Ea will be omitted. Incidentally, in FIG. 8, a solid arrow indicates a forward path of light, and a broken-line arrow indicates a return path of light similarly to FIG. 2.

In contrast to the second embodiment in which the plurality of capillaries 5 are irradiated with spatially divided beams of the measurement light R3, the plurality of capillaries 5 are irradiated with one beam of the measurement light R3 divided in time without dividing the measurement light R3 in the third embodiment. With such a configuration, the detection device 1b according to the third embodiment enables parallel measurement of a plurality of samples.

When compared with the configuration of the detection device 1 illustrated in FIG. 2, the configuration of the detection device 1b illustrated in FIG. 8 is different in terms of including a galvano mirror 141 and the plurality of capillaries 5 (5a to 5c). Here, the galvano mirror 141 is installed between the λ/4 plate 107 and the lens 108, and changes an optical path between the λ/4 plate 107 and the lens 108.

An angle of the galvano mirror 141 is controlled by an analysis device 2b. When the angle of the galvano mirror 141 is changed in this manner, it is possible to sequentially irradiate the capillaries 5a to 5c in the capillary array 50 with the measurement light R3.

(Analysis Device 2b)

Figure 9:
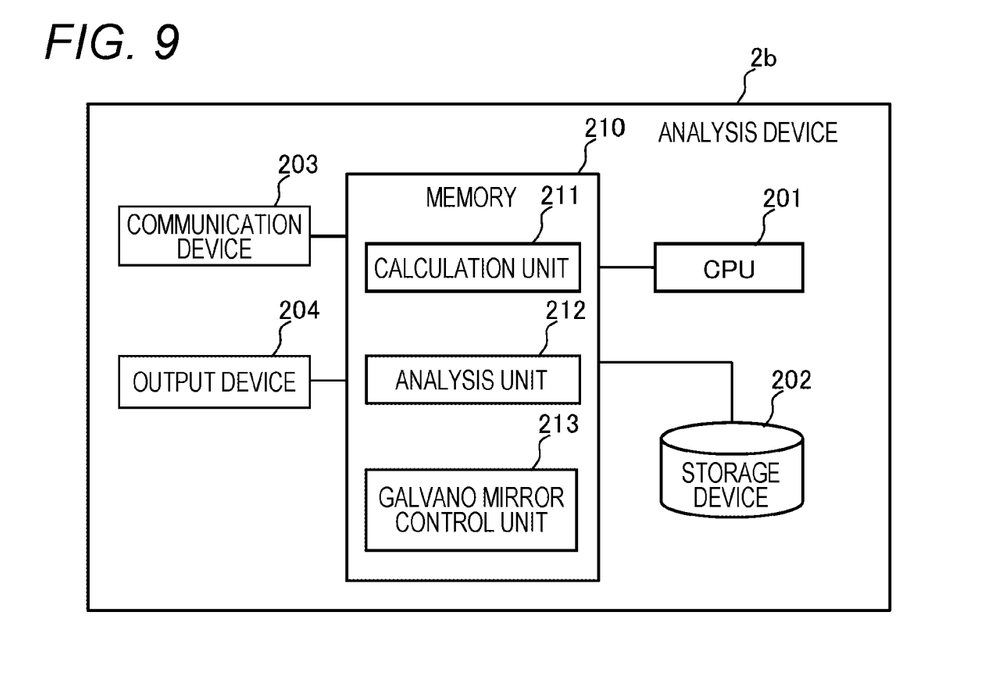
FIG. 9 is a diagram illustrating a configuration example of an analysis device used in the third embodiment.

FIG. 9 is a diagram illustrating a configuration example of the analysis device 2b used in the third embodiment. Incidentally, configurations similar to those in FIG. 3 will be denoted by the same reference signs in FIG. 9, and the description thereof will be omitted.

The analysis device 2b illustrated in FIG. 9 is different from the analysis device 2 illustrated in FIG. 3 in terms of including a galvano mirror control unit 213.

The galvano mirror control unit 213 controls an inclination of the galvano mirror 141.

(Control of Galvano Mirror 141)

Figure 10:
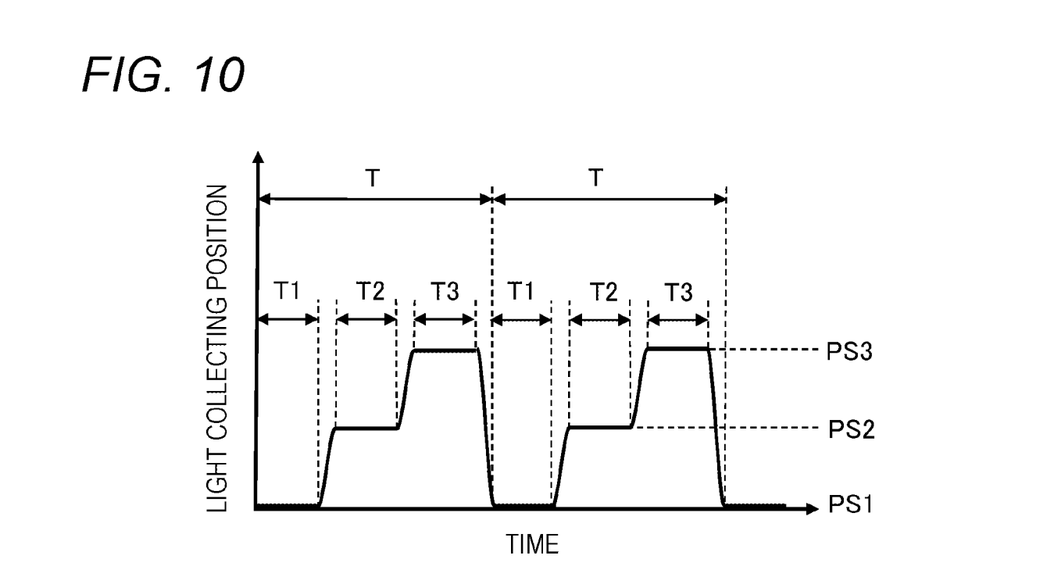
FIG. 10 is a graph illustrating a change in a light collecting position of a lens by control of a galvano mirror.

FIG. 10 is a graph illustrating a change in a light collecting position of the lens 108 by control of the galvano mirror 141. FIG. 8 will be referred to as appropriate.

As illustrated in FIG. 10, the galvano mirror control unit 213 of the analysis device 2b sequentially irradiates the capillaries 5a to 5c with the measurement light R3 by changing am angle of the galvano mirror 141 stepwise with time. Here, a light collecting position PS1 indicates a position of the capillary 5a, and a light collecting position PS2 indicates a position of the capillary 5b. Similarly, a light collecting position PS3 indicates a position of the capillary 5c.

Here, a period T1 indicates a time during which the capillary 5a is irradiated with the measurement light R3. Further, a period T2 indicates a time during which the capillary 5b is irradiated with the measurement light R3. Further, a period T3 indicates a time during which the capillary 5c is irradiated with the measurement light R3.

A time T of one cycle of control of the galvano mirror 141 is determined by a sampling frequency of data constituting an electropherogram. The sampling frequency may be any value as long as a sufficient score for constituting the electropherogram can be obtained during one electrophoresis (for about 30 minutes), and can be set to, for example, 2 Hz. In this case, it is necessary to irradiate all the capillaries 5 with the measurement light R3 once for 0.5 s, and thus, the cycle needs to be 0.5 s or less. Since a typical response speed of the galvano mirror 141 is about 10 ms or less, control at the cycle of 0.5 s or less is sufficiently possible. Further, when the galvano mirror 141 capable of performing high-speed control is used in this manner, it is possible to minimize a time for which a portion other than the capillary 5 (space between the capillary 5 and the capillary 5) is irradiated with the measurement light R3 differently from PTL 1, and it is possible to suppress a decrease in detection sensitivity.

In the third embodiment, each of the plurality of capillaries 5 is reciprocally irradiated with the measurement light R3 that has been divided in time using the galvano mirror 141 capable of high-speed response. In this manner, a high detection sensitivity similar to that of the first embodiment can be achieved, and parallel measurement of a plurality of samples can be achieved. As a result, the capillary electrophoresis device Ea according to the third embodiment can achieve a higher throughput than that of a conventional capillary electrophoresis device. Furthermore, the capillary electrophoresis device Ea according to the third embodiment irradiates each of the capillaries 5 with the measurement light R3 in a time-division manner, so that signals corresponding to the plurality of capillaries 5 can be detected by the single measurement photodiode 113. As a result, it is possible to provide the downsized capillary electrophoresis device Ea at low cost.

Incidentally, the galvano mirror 141 is used as an optical switching unit that irradiates the capillary 5 with the measurement light R3 in a time-division manner in the third embodiment. With such a configuration, it is possible to achieve the detection device 1b having excellent high-speed responsiveness. However, a method of moving a position of the capillary 5 using a stage or the like may be used as the optical switching unit. An optical deflector that changes a reflection angle of light, such as a polygon mirror or a micro-electro-mechanical systems (MEMS) mirror 111, may be used. When such an optical deflector as an optical switching unit, it is possible to achieve the optical switching unit having more excellent responsiveness as compared with the method of moving the capillary 5 using the stage or the like. A photoacoustic element or the like can also be used as the optical switching unit.

Incidentally, the present invention is not limited to the above-described embodiments and includes various modifications. For example, the above-described embodiments have been described in detail in order to describe the present invention in an easily understandable manner, and are not necessarily limited to one including the entire configuration that has been described above. Further, configurations of another embodiment can be substituted for some configurations of a certain embodiment, and a configuration of another embodiment can be added to a configuration of a certain embodiment. Further, addition, deletion or substitution of other configurations can be made with respect to some configurations of each embodiment.

Further, a part or all of each of the above-described configurations, functions, units 211 to 213, storage device 202, and the like may be implemented, for example, by hardware by designing with an integrated circuit and the like. Further, the above-described respective configurations, functions and the like may be implemented by software by causing the processor, such as the CPU 201, to interpret and execute a program for implementing the respective functions as illustrated in FIGS. 3 and 9. Information such as a program, a table, and a file that implements each function can be stored in not only the HD but also a recording device such as a memory and a solid state drive (SSD) or a recording medium such as an integrated circuit (IC) card, a secure digital (SD) memory card, a digital versatile disc (DVD).

Further, control lines and information lines considered to be necessary for the description have been illustrated in the respective embodiments, and it is difficult to say that all of the control lines and information lines required as a product are illustrated. It may be considered that most of configurations are practically connected to each other.

REFERENCE SIGNS LIST 5 capillary
101 light source (light source unit, irradiation optical unit)
102 lens (irradiation optical unit, first collimator lens)
103 band-pass filter (irradiation optical unit)
104 polarization beam splitter (irradiation optical unit, polarization separator)
106 reference photodiode (second light detection unit)
107 λ/4 plate (irradiation optical unit)
108 lens (Irradiation optical unit, second collimator lens)
108, 109 lens (irradiation optical unit)
110 lens (irradiation optical unit, third collimator lens)
111 mirror (reflector)
113 measurement photodiode (first light detection unit)
121 lens (optical divider, optical coupler)
122 lens (optical divider, optical coupler)
130 fiber bundle (optical divider)
131 optical fiber (optical divider)
141 galvano mirror (optical switching unit, optical deflector)
140 Koehler illumination system (optical divider, optical coupler)
E, Ea capillary electrophoresis device
R2 reference light (light of second polarization component)
R3 measurement light (light of first polarization component)

The invention claimed is:

1. A capillary electrophoresis device comprising:
a light source unit;
an irradiation optical unit that causes light emitted from the light source unit to be reciprocally transmitted through a capillary; and
a first light detection unit that detects an optical signal based on the light reciprocally transmitted through the capillary, wherein
the irradiation optical unit includes,
in order from a side of the light source unit,
a polarization separator that transmits light of a first polarization component, which is one polarization component out of polarization components of the light emitted from the light source unit, and reflects light of a second polarization component which is another polarization component, and
a λ/4 plate provided at a preceding stage of the capillary, and
a reflector that reflects the light of the first polarization component which has passed through the capillary in a direction toward the capillary.

2. The capillary electrophoresis device according to claim 1,
wherein
the irradiation optical unit includes,
in order from a side of the light source unit,
a first collimator lens,
a polarization beam splitter as the polarization separator,
the λ/4 plate,
a second collimator lens that is provided at a preceding stage of the capillary and collects light transmitted through the λ/4 plate on the capillary, and
a third collimator lens that is provided at a subsequent stage of the capillary, is provided at a preceding stage of the reflector, and collects the light reflected by the reflector on the capillary.

3. The capillary electrophoresis device according to claim 1,
wherein
the irradiation optical unit further includes
an optical divider that divides the light emitted from the light source unit into at least a same number of beams of the light as a number of the capillaries or more, and simultaneously irradiates each of a plurality of the capillaries with the divided beams of light.

4. The capillary electrophoresis device according to claim 3, wherein
the optical divider includes an optical coupler that couples the light emitted from the light source unit to each of a plurality of optical fibers.

5. The capillary electrophoresis device according to claim 4, wherein
the optical coupler couples the light emitted from the light source unit to each of the optical fibers to have a uniform spatial intensity distribution.

6. The capillary electrophoresis device according to claim 5, wherein
the optical fibers constitute an optical fiber bundle, and
the optical fibers in the optical fiber bundle have a closest packing arrangement.

7. The capillary electrophoresis device according to claim 5, wherein
the optical coupler is a Koehler illumination system.

8. The capillary electrophoresis device according to claim 1,
wherein
the irradiation optical unit further includes
an optical switching unit that temporally switches a plurality of the capillaries irradiated with the light.

9. The capillary electrophoresis device according to claim 8, wherein the optical switching unit is an optical deflector that changes a reflection angle of light.

10. The capillary electrophoresis device according to claim 9, wherein the optical deflector is a galvano mirror.

11. The capillary electrophoresis device according to claim 8, wherein the first light detection unit is a single photodiode that detects the optical signal based on light emitted to the capillary twice.

12. The capillary electrophoresis device according to claim 1,
further comprising
a second light detection unit that detects the light of the second polarization component out of the light from the light source unit split by the polarization separator.

* * * * *